US006372105B1

(12) United States Patent
Saito et al.

(10) Patent No.: US 6,372,105 B1
(45) Date of Patent: Apr. 16, 2002

(54) APPARATUS FOR MEASURING A SILVER OR HALOGEN ION CONCENTRATION

(75) Inventors: Hirokazu Saito, Kanagawa; Sugihiko Tada, Shizuoka, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1003 days.

(21) Appl. No.: 08/657,903

(22) Filed: Jun. 7, 1996

Related U.S. Application Data

(62) Division of application No. 08/549,543, filed on Oct. 27, 1995, now Pat. No. 5,702,851.

(30) Foreign Application Priority Data

Oct. 28, 1994 (JP) ............................................ 6-287243
Nov. 14, 1994 (JP) ............................................ 6-279305

(51) Int. Cl.[7] ................................................ G01N 27/26
(52) U.S. Cl. .................... 204/400; 204/435; 205/778.5; 205/780; 205/789.5; 430/30
(58) Field of Search ................................. 204/400, 416, 204/419, 435; 205/789.5, 778.5, 780

(56) References Cited

U.S. PATENT DOCUMENTS

| | | | | | |
|---|---|---|---|---|---|
| 2,370,871 | A | * | 3/1945 | Marks | 204/435 |
| 2,584,816 | A | * | 2/1952 | Sands | 204/435 |
| 2,846,386 | A | * | 8/1958 | Ingruber | 204/435 |
| 3,031,304 | A | | 4/1962 | Oliver | |
| 3,415,650 | A | | 12/1968 | Frame et al. | |
| 3,801,326 | A | | 4/1974 | Claes | |
| 3,806,439 | A | * | 4/1974 | Light et al. | 204/435 |
| 3,821,002 | A | | 6/1974 | Culthane et al. | |
| 3,833,495 | A | * | 9/1974 | Grubb | 204/435 |
| 4,026,668 | A | | 5/1977 | Culhane et al. | |
| 4,094,684 | A | | 6/1978 | Maskasky | |
| 4,933,870 | A | * | 6/1990 | Chang | 364/497 |
| 5,248,577 | A | * | 9/1993 | Jerome | 430/30 |

FOREIGN PATENT DOCUMENTS

| | | |
|---|---|---|
| FR | 0356342 | 2/1990 |
| FR | WO9112522 | 8/1991 |
| GB | 1263680 | 1/1969 |
| JP | 0313657 | 5/1989 |

OTHER PUBLICATIONS

Lingane, "Electroanalytical Chemistry", 2d ed., (1958), pp. 362–363.*
Durst, "Ion–Selection Electrodes", National Bureau of Standards Special Publication 314, (Nov. 1969), p. 77.*
Quantitative Kinetic Study of Crystal Growth, I. Effect of Dilution on Crystal Growth during the Precipitation of Silver Bromide in Gelatin, Claes et al., Photographische Korrespondez, Nr. 1208 der ganzen Folge, Nr. Mar. 1965, pp. 37–42.
Photographic Emulsion Chemistry, G.F. Duffin, The Focal Press, London & New York, pp. 12–15 (1966).

* cited by examiner

*Primary Examiner*—T. Tung
(74) *Attorney, Agent, or Firm*—Sughrue Mion, PLLC

(57) ABSTRACT

A method of producing a silver halide photographic emulsion in which a silver ion concentration in precipitation of a silver halide emulsion in a precipitation bath is controlled, wherein a precipitation bath in which stirring is conducted rapidly and uniformly, and crystal formation and crystal growth are uniformly performed is used, the method comprises the steps of: in a start period of precipitation, quantitatively adding a silver nitrate solution and a halogen salt solution at a constant ratio flow rate; when an $E_{Ag}$ value reaches a designated $E_{Ag}$ value region in the vicinity of a preset target $E_{Ag}$ value, starting a control of an adding rate of the halogen salt solution by using a controller which has an operation period equal to or shorter than 1 sec.; and after holding a tuning parameter of a proportional, integral and differential (PID) action controller to a minimum response level, conducting a control in which the tuning parameter is switched to an optimum control tuning parameter which corresponds to the preset target value and a solute rate of silver/halogen ions to be added.

4 Claims, 6 Drawing Sheets

APPARATUS FOR MEASURING A SILVER OR HALOGEN ION CONCENTRATION

This is a divisional of application Ser. No. 08/549,543 filed Oct. 27, 1995, now U.S. Pat. No. 5,702,851.

BACKGROUND OF THE INVENTION

1. Field of the Invention

The invention relates to a method of producing a silver halide photographic emulsion, an apparatus for the same, and also a method of measuring a silver or halogen ion concentration of an emulsion during or after the formation of a silver halide photographic emulsion, and an apparatus for the same.

2. Description of the Related Art

As a prior art technique, U.S. patent specification No. 3,031,304 discloses a method of producing a fine particle emulsion which has a mean particle diameter of 0.06 $\mu$mm. In the specification, a convenient method is disclosed in which particles are formed in a pAg range of about 2 to 6 by using a method of simultaneously mixing a silver nitrate solution and a potassium bromide solution which are reaction liquids, and four pumps are used for injecting the reaction liquids so as to automatically control the pAg. Specifically, the silver nitrate solution and the potassium bromide solution are separately provided with a pump so as to be injected in a substantially stoichiometrically equivalent amount. A potentiometer circuit has a limit switch which, when a silver ion concentration of an emulsion in a precipitation solution is raised to pAg of 5 or more, functions so as to decrease the amount of potassium bromide pumped to be injected, by 1% by means of a third pump. When pAg reaches to 5 or more, the third pump is stopped. When pAg is lowered to a predetermined level, usually 4.3 or less, potassium bromide to be injected is added by the third pump.

The fourth potassium bromide injecting pump is used for a manual addition. In accordance with the reading of the potentiometer or a recorder, the operator can adequately adjust the addition of potassium bromide.

Furthermore, U.S. patent specification No. 3,821,002 discloses a control apparatus and a method of producing a silver halide emulsion. In the apparatus and method, pAg in a precipitation bath is made constant or changed, and the flow rates of a silver nitrate solution and a halogen sale solution to be added are changed in accordance with a program so that the required accuracy of pAg is maintained.

Furthermore, Photogr. Korresp. 101, 37 (1965) teaches relationships of crystal diameters of silver halide and the number of particles which are obtained by maintaining the temperature, and adjusting valves for adding a silver nitrate solution and a halogen salt solution, by an electrical control, thereby controlling pAg and pH.

All the three publications relate to a control of a preset target value, and teach only that several minutes must be elapsed in the period from the uncontrolled state at the start of reaction to the control of the pAg value stabilized at the preset target value, and the controlled state is unstable. The publications say nothing about a control method on apparatus-for causing the pAg value to rapidly reach a preset target value and conducting a control at the preset target value.

Japanese Patent Unexamined Publication No. SHO 61-65305 discloses an optimum control method in which a defect of the conventional PID control is eliminated and a computer control is done in accordance with a mathematical model. Japanese Patent Unexamined Publication No. HEI 5-181504 discloses an adaptive control method having a feedforward element in which a sequential plant model in the control of a physical quantity of a system is estimated, the control is conducted on the basis of the plant model, a variation quantity at an elapse of a dead time with respect to a variation externally applied to the system is predicted by using a variation pattern of a physical quantity which causes the external variation, and the external variation at an elapse of a dead time is previously canceled. U.S. patent specification No. 4,933,870 discloses a method of producing a silver halide emulsion which employs an apparatus and method of converting an output signal of a nonlinear ion sensor into a linear signal. U.S. patent specification No. 5,248,577 discloses an apparatus and method of producing a silver halide emulsion in which the density of halogen ions and flow rates of added halogen salt and silver nitride solutions are periodically measured, the measured data are accumulated, an internal calculation is conducted by an equation estimated on the basis of the accumulated data, and the flow rates of the added halogen salt and silver nitride solutions are controlled. In these disclosed techniques, complex calculations are done, and hence it is difficult for a controller or computer which is commercially available, to conduct processing with a short period. These publications make no mention of a method or apparatus which is used for starting the control from the uncontrolled state. When the pAg distribution in a precipitation vessel is uniform, a conventional PID control can sufficiently cope with the control at a steady state far as disturbance is not extremely produced.

However, relationships between a potential $E_{Ag}$ corresponding to the silver ion activity and ion concentrations of silver nitride and halogen salt (e.g., potassium bromide) in a liquid containing silver halide crystals are linear and abruptly changed at the equivalence point as shown in FIG. 1. In the $E_{Ag}$ range of −50 mV to +150 mV where precipitation of a silver halide emulsion is often conducted while controlling the silver ion concentration, a very small change in concentration of silver ions or halogen ions causes the potential to be abruptly changed. Even when, in the uncontrolled state at the start of precipitation, the control is to be conducted at the preset target $E_{Ag}$ potential, pAg in a conventional precipitation bath is largely changed in an initial period of precipitation and hardly converged into the target value, with the result that several minutes must be elapsed before pAg is stabilized. Furthermore, the potential locus of $E_{Ag}$ obtained until the controlled state is attained cannot be reproduced.

As the scale of a precipitation bath is increased, the control is further unstabilized, and hence it is difficult to stably produce a silver halide emulsion of constant quality.

Also, conventionally, in order to obtain desired photographic characteristics, it is essential to control the silver or halogen ion concentration during or after the formation of a silver halide photographic emulsion, and a technique is widely employed in which reference and indicator electrodes for the above-mentioned control are directly inserted into a precipitation vessel in which a halogen salt aqueous solution reacts with a silver nitrate aqueous solution and which contains a gelatin aqueous solution.

The relationships between a silver or halogen ion concentration and an electrode potential is described in "The Theory of the Photographic Process, Third edition or Fourth edition (Macmillan Publishing Co., Inc.)".

Silver and halogen ion concentrations are respectively defined by equations (1) and (2):

$$pAg = -\log[Ag^+] \quad (1)$$

$$pX = -\log[X^-] \quad (2)$$

where $[Ag^+]$ indicates the silver ion activity, and $[X^-]$ indicates the halogen ion ($Br^-$, $Cl^-$, or $I^-$) activity.

The electrode potentials $E_{Ag}$ and $E_X$ in relation to the silver or halogen ion activity in silver halide crystals are expressed as follows:

$$E_{Ag} = E°_{Ag} - 2.30259 \times (RT/F) \times pAg \quad (3)$$

where $E°_{Ag}$ indicates the standard potential for a silver half cell, R indicates the gas constant, F indicates the Faraday constant, and T indicates an absolute temperature.

In a silver halide emulsion which is practically used, halogen halide is often in excess, and hence a silver indicator electrode is covered by a silver halide layer and saturated with silver halide salt. Therefore, the silver ion and halogen ion activities on the surface of the electrode have the relationship of equation (4) below, $$[Ag^+][X^-] = Ksp \quad (4)$$

where Ksp indicates the solubility product of silver halide.

In other words, a silver/silver halide electrode is essentially equivalent to a silver electrode in which the silver ion activity is governed by the halogen ion activity in a solution.

Therefore, Ex is expressed by equation (5) below, but an indicator electrode in a silver halide emulsion indicates the same potential because the emulsion solution is in equilibrium with silver halide crystals.

$$Ex = E°_{AgX} + 2.30259 \times (RT/F) \times pX \quad (5)$$

$$E_{Ag} = Ex \text{ (it is assumed that Ex=E)} \quad (6)$$

The electrode potential E can be measured by forming a cell system in combination with a potential $E_R$ of a reference electrode which produces the reference potential, and detecting a potential difference. The relationships between E and pAg and PX can be expressed by the following equations:

$$E = E°_{Ag} - E_R - 2.30259 \times (RT/F) \times pAg \quad (7)$$

$$E = E°_{AgX} - E_R - 2.30259 \times (RT/F) \times pX \quad (8)$$

Therefore, the states of pAg and PX of a silver halide photographic emulsion can be grasped by measuring the potential E of the indicator electrode.

When the reference electrode which functions as the reference of a potential measurement is inserted into a measured liquid, however, the temperature variation of the measured liquid causes a long period to be elapsed before a constant potential is obtained. Therefore, it is impossible to continuously measure instantaneous variations of an ion concentration, gelatine and silver halide particles adhere to the liquid junction of the reference electrode to clog the liquid junction, whereby an asymmetry potential is produced so that it is difficult to obtain a constant potential which functions as the reference. (See "Photographic Emulsion Chemistry 1966" by G. F. Duffin, p. 14, FOCAL PRESS LIMITED.)

When a silver ion activity of a system such as a gelatin aqueous solution containing the silver halide crystals is measured with using a conventional silver metal rod as an indicator electrode, the reproducibility of the measured potential in repeated measurements is not always satisfactory. Furthermore, silver halide crystals obtained from the system vary in size distribution, shape, photographic characteristics, etc.

Japanese Patent Unexamined Publication No. SHO 60-213858 discloses a method in which, as a countermeasure for stabilizing a conventional electrode for detecting a silver ion concentration in order to obtain stabilization of the indicator electrode, an alloy electrode made of silver and a metal of one or more kind which is nobler than silver, or of metals of two or more kinds which are nobler than silver is used.

In the method disclosed in Japanese Patent Examined Publication No. SHO 60-213858, however, a measured liquid penetrates into a small gap between the metal silver and its alloy which function as the indicator electrode, and a holding cover for the electrode, and adheres to the electrode and the cover. When liquids of different kinds are to be measured, therefore, it is impossible to obtain an accurate value.

SUMMARY OF THE INVENTION

The present invention has been made to solve the above-mentioned problems, and therefore an object of the invention is to provide a method and apparatus in which, in formation of a silver halide photographic emulsion while controlling the silver ion concentration in precipitation of a silver halide emulsion in a precipitation bath, the system can rapidly attain a potential corresponding to the silver ion activity with excellent reproducibility after starting from an uncontrolled state at the start of precipitation, and a silver halide photographic emulsion can be produced while conducting a control at the preset target value.

Another object of the invention is to provide a method and apparatus for measuring a silver or halogen ion concentration in which the temperature variation of a reference electrode is eliminated so as to ensure a constant reference potential, and the manner of mounting an indicator electrode is improved so that the measurement is always correctly performed, whereby the silver or halogen ion concentration during the formation of a silver halide photographic emulsion can be measured instantaneously with excellent reproducibility and the reaction state of the formation of silver halide crystals can be traced correctly.

In order to solve the above-mentioned objects, a first aspect of the invention has been achieved by the provision of a method of producing a silver halide photographic emulsion in which a silver ion concentration in precipitation of a silver halide emulsion in a precipitation bath is controlled, wherein a precipitation bath in which stirring is conducted rapidly and uniformly, and crystal formation and crystal growth are uniformly performed is used, and the method comprises the steps of: in a start period of precipitation, quantitatively adding a silver nitrate solution and a halogen salt solution at a constant ratio flow rate; when an $E_{Ag}$ value reaches a designated $E_{Ag}$ value region in the vicinity of a preset target $E_{Ag}$ value, starting a control of an adding rate of the halogen salt solution by using a controller which has an operation period equal to or shorter than 1 sec.; and, after holding a tuning parameter of a proportional, integral and differential (PID) action controller to a minimum response level, conducting a control in which the tuning parameter is switched to an optimum control tuning parameter which corresponds to the preset target value and a solute rate of silver/halogen ions to be added.

In the above-mentioned method of producing a silver halide photographic emulsion, the tuning parameter is previously estimated in accordance with a simulation based on a plant model, whereby a calculation period of a control system is eliminated and a control response speed is increased, and a control using a direct digital loop controller (DDLC) is conducted.

In the above-mentioned method of producing a silver halide photographic emulsion, the precipitation bath in which stirring is conducted rapidly and uniformly and crystal formation and crystal growth are uniformly performed is a precipitation bath in which the silver nitrate solution and the halogen salt solution are separately supplied through a lower end portion of a mixing chamber consisting of a casing, the solutions are diluted with a colloid aqueous solution charged in the mixing chamber, both the reaction solutions are abruptly stirred by first stirring means to react with each other, thereby forming silver halide particles, the silver halide particles are immediately or within 1 sec. or shorter to be discharged into a colloid aqueous solution existing outside and above the mixing chamber and in the precipitation bath, and the silver halide particles are aged.

Also, the first aspect of the invention has been achieved by the provision of an apparatus for producing a silver halide photographic emulsion in which a silver ion concentration in precipitation of a silver halide emulsion in a precipitation vessel is controlled, wherein the precipitation bath comprises: a silver nitrate solution tank and a halogen salt solution tank which are separately disposed outside the precipitation bath; a mixing chamber consisting of a casing, the casing being disposed at a position where is in the center of the precipitation bath which is filled with a colloid aqueous solution, and close to a bottom of the bath, an interior of the casing being filled with the colloid aqueous solution, upper and lower ends of the casing being opened, an impeller being disposed inside the casing, supply ports for a silver nitrate solution and a halogen salt solution being disposed in a lower end portion of the mixing chamber; first stirring means for rapidly mixing both the reaction solutions and causing the solutions to react with each other, the stirring means being disposed in a lower interior portion of the mixing chamber; and a second stirring means for immediately upward discharging formed silver halide particles to an outside of the mixing chamber, the stirring means being disposed in an upper interior portion of the mixing chamber, an adding system for the silver nitrate solution is provided with constant flow rate holding means, three flow rate controlling means are connected in parallel to an adding system for the halogen salt solution which corresponds to the adding system for the silver nitrate solution, two of the flow rate controlling means are respectively provided with constant flow rate holding means, the other flow rate controlling means is provided with flow rate controlling means which is based on the electrode for detecting a silver ion activity, the other constant flow rate holding means comprises flow rate controlling means which is based on the electrode system, and the apparatus comprises a device which switches one of the constant flow rate holding means to the flow rate holding means based on the electrode system, in accordance with a preset potential corresponding to a designated silver ion activity.

In the invention, in order to use a precipitation bath in which stirring is conducted rapidly and uniformly and crystal formation and crystal growth are uniformly performed, the interior of the precipitation bath must be uniform so that the ion detection is correctly rapidly conducted, as a precondition for the method of producing a silver halide emulsion. To comply with this, for example, the method and apparatus disclosed in Japanese Patent Examined Publication No. SHO 55-10545 may be employed.

In the invention, the step of adding a silver nitrate solution and a halogen salt solution at a constant ratio or a constant flow rate means a process in which the solutions are quantitatively added by, for example, using a constant valve opening or an orifice plate functioning as the constant flow rate holding means.

In the invention, as means for controlling a silver nitrate solution and a halogen salt solution at a constant ratio or a constant flow rate, means for controlling the opening of a valve may be used, or, when a pump is used, means for controlling the number of revolutions of a motor for driving the pump may be used. In place of using a control of a control valve in the valve opening range where the flow rate can be adjusted most easily, therefore, the flow rate control may be conducted in accordance with a detected $E_{Ag}$ value by controlling the number of revolutions of the motor for driving the pump.

In the invention, the designated $E_{Ag}$ value region in the vicinity of a preset target $E_{Ag}$ value means a region where the potential has a value of ±5 to ±60 mV, preferably ±10 to ±30 mV with respect to the potential $E_{Ag}$ corresponding to the preset target pAg.

In the invention, the use of a controller which has a calculation period equal to or shorter than 1 sec. means an execution of a high speed control at 0.1 to 1.0 sec., preferably 0.2 sec. or shorter by using a direct digital loop controller of one loop, such as TOSDIC-211 manufactured by Toshiba Corporation, or YW-SERIES80 manufactured by Yokogawa Electric Corporation.

In the invention, the holding of a tuning parameter to a minimum response level means that the holding time when the proportional band is set to be 99.9% or more, the integral time is set to be 500 sec. or longer, and the derivative time is set to be from 0 sec. is set to be from 0.1 to 5 sec., preferably 0.5 to 1.0 sec.

In the invention, also when a pump is used, a pump for always controlling the flow rate, and that for adding a fixed amount of the major portion of the addition amount may be used independently from each other so that the addition is conducted by the sequence operation shown in FIG. 3.

A flow rate control valve may be driven by air, or alternatively means for adjusting the opening by a servomotor may be used.

Also, in order to solve the above objects, a second aspect of the invention has been achieved by the provision of a method of measuring a silver or halogen ion concentration wherein, in a sensor system which detects as a potential a silver or halogen ion concentration in a gelatin aqueous solution containing silver halide crystals, a reference electrode which functions as a reference of a potential measurement is inserted into a heat insulating bath without being directly inserted into the measured liquid, the bath being accurately controlled to have a constant temperature and electrically insulated, the measured liquid and the reference electrode are electrically connected with each other by a salt bridge, only one end portion of an indicator electrode is immersed into the measured liquid, the reference electrode and another end portion of the indicator electrode are connected with a potentiometer, and a potential is measured.

Also, the second aspect of the invention has been achieved by the provision of an apparatus for measuring a silver or halogen ion concentration, comprising: a reference electrode which is disposed in a heat insulating bath which has a constant temperature and is electrically insulated, only an end portion of the reference electrode being electrically connected with a gelatin aqueous solution containing silver halide crystals, by a salt bridge; an indicator electrode, only one end portion of the indicator electrode being immersed into the gelatin aqueous solution containing silver halide crystals; and a potentiometer which is electrically connected with the reference electrode and another end portion of the indicator electrode via a silver wire.

In the above-mentioned apparatus, a ceramic having micropores is used in a portion of the salt bridge, the portion making contact with the gelatin aqueous solution containing silver halide crystals, and a potassium nitrate solution is used as an inner liquid of the salt bridge.

Further, the second aspect of the invention has been achieved by the provision of an apparatus for measuring a silver or halogen ion concentration, wherein a silver metal rod of a purity of 99.9% or higher is used as the indicator electrode, platinum plating or an insulating material coating is applied onto a portion of the indicator electrode, the portion making contact with a holder unit, and the surface of the portion making contact with the gelatin aqueous solution containing silver halide crystals is plated by AgBr or $Ag_2S$ in a thickness of 0.1 μm or less.

In the invention, the salt bridge between the gelatin aqueous solution containing silver halide crystals (hereinafter, referred to as "measured liquid") and the reference electrode is preferably constructed of flexible plastic hose and a $KNO_3$ solution is used as an inner liquid in the hose, and the concentration of the solution is from 0.01 to 5 Mol/l, preferably from 0.8 to 1.2 Mol/l.

In the invention, the immersion of only one end portion of the indicator electrode into the measured liquid means that only the tip end of one end portion of the indicator electrode is immersed and the body portion of the silver rod is not immersed into the measured liquid. The measurement of the potential is performed by measuring the potential difference between the reference electrode and the indicator electrode by means of a potentiometer.

In the invention, the heat insulating bath which has a constant temperature and is electrically insulated is preferably made of vinyl chloride or acrylic resin, such an chloroethylene or acrylic material, or provided with an insulation property and the inner liquid (the same as the salt bridge of inner liquid) of the vessel having an insulation property of 100 MΩ or higher maintained within ±0.5° C. by a thermostatic chamber or the like, whereby the stability of the reference potential depending on the temperature is maintained.

In the invention, the use of ceramic having micropores in a portion of the salt bridge which makes contact with the gelatin aqueous solution containing silver halide crystals means that one end of the salt bridge is blocked by porous ceramic having a porosity from 2 to 40%, preferably from 5 to 15% so that the potassium nitrate solution which is the inner liquid passes through the ceramic plug to flow out from the heat insulating bath into the gelatin aqueous solution containing silver halide crystals in a flow rate from 0.01 to preferably 0.1 to 1 cc/min. at a head of 9.8 KPa. 10 cc/min., preferably from 0.1 to 1 cc/min. at a head pressure of 9.8 KPa.

In the invention, a silver metal rod of a purity of 99.9% or higher is used as the indicator electrode, and platinum plating or an insulating material coating is applied onto a portion of the silver metal rod which makes contact with the holder unit. As the insulating material, Teflon or ceramic is used. The silver metal rod is inserted through the holder unit and supported thereby via, for example, an O-ring. The surface of the one end portion which makes contact with the gelatin aqueous solution containing silver halide crystals is plated by AgBr or $Ag_2S$ in a thickness of 0.1 μm or less. This allows the accuracy of the potential of the indicator electrode to be maintained.

Alternatively, a glass electrode may be used as the indicator electrode. In the alternative, a sensor system which can measure pH stably and with excellent reproducibility can be realized.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Figure 1:
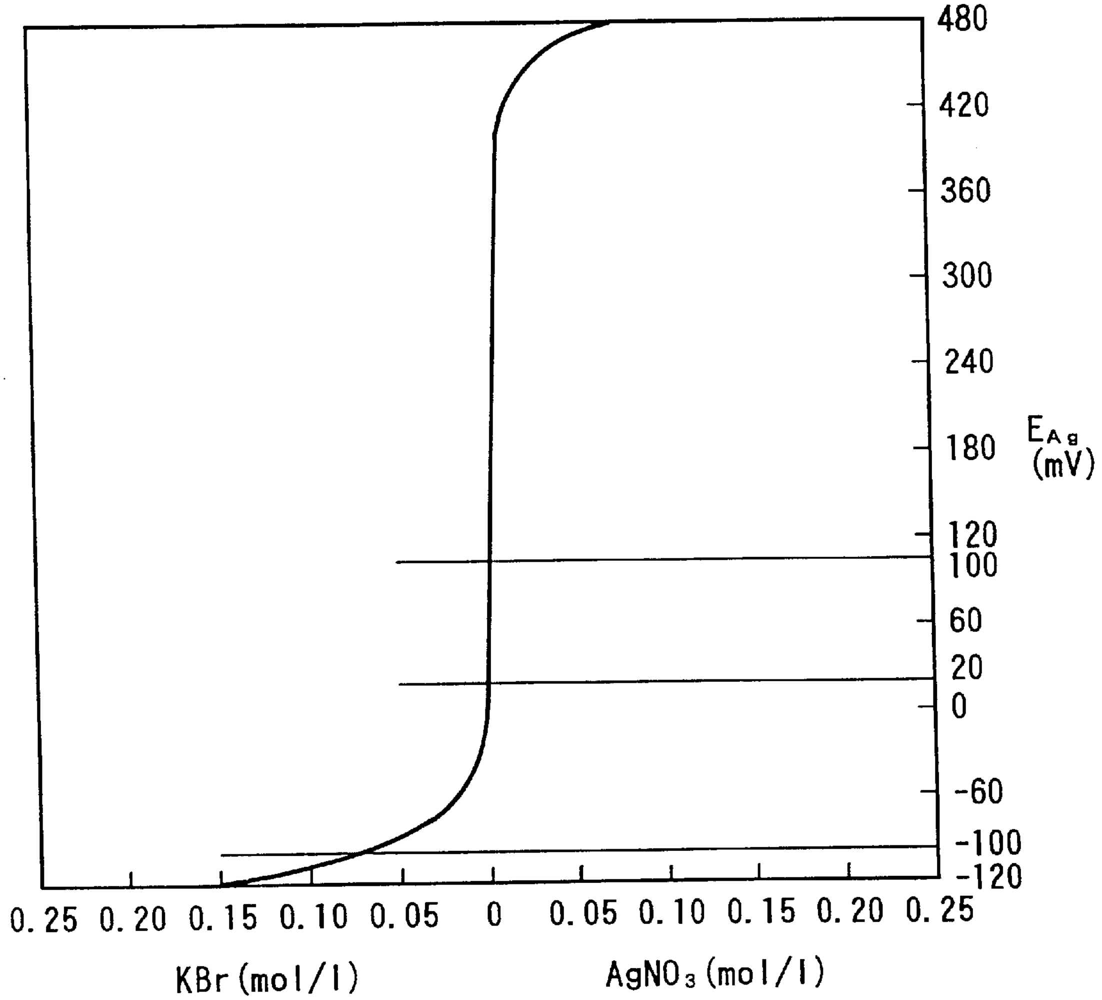
FIG. 1 is a graph illustrating relationships between concentrations of KBr and $AgNO_3$ versus the $E_{Ag}$ potential.
Figure 2:
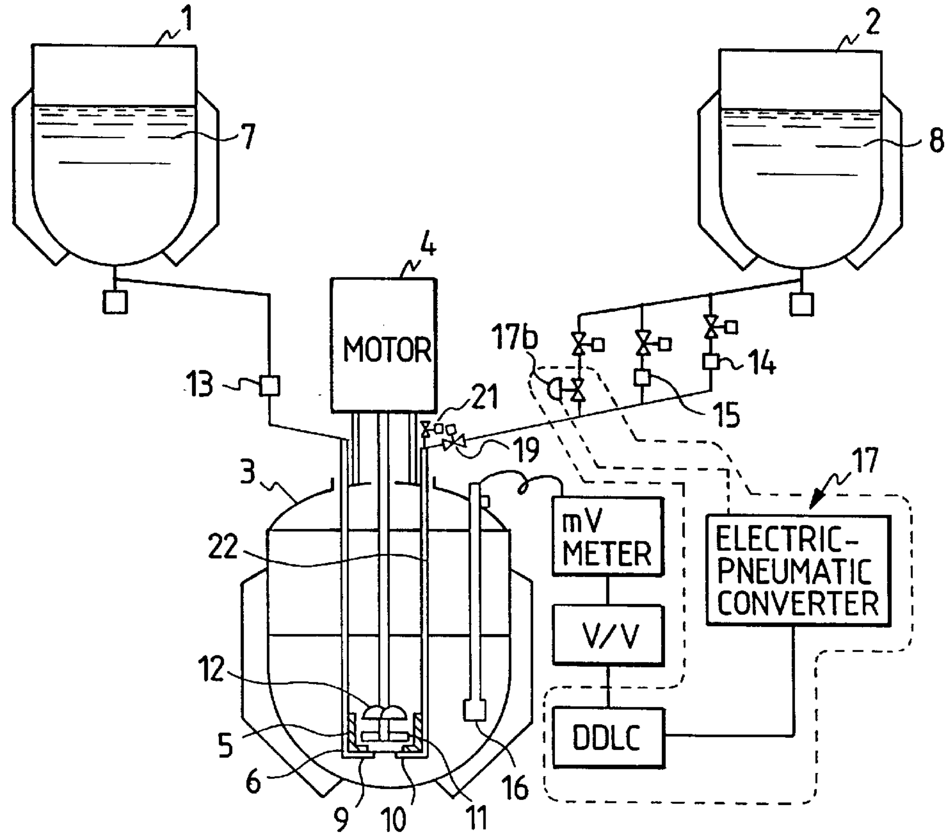
FIG. 2 is a flow sheet of an embodiment of a precipitation bath used in the invention.

A manner of embodying the invention will be described with reference to the figures. In the invention, as a precipitation bath in which stirring is conducted rapidly and uniformly and crystal formation and crystal growth are uniformly performed, a precipitation bath 3 such as shown in FIG. 2 is used. Specifically, the precipitation bath comprises: a silver nitrate solution tank 1 and a halogen salt solution tank 2 which are separately disposed outside the precipitation bath 3; a mixing chamber 5 consisting of a casing which is disposed at a position where is in the center of the precipitation bath 3 filled with a colloid aqueous solution, and close to the bottom of the bath, an interior of the casing being filled with the colloid aqueous solution, upper and lower end of the casing being opened, stirring means being disposed inside the casing; supply ports 9 and 10 which are respectively for a silver nitrate solution 7 and a halogen salt solution 8 and disposed in a lower end portion 6 of the mixing chamber; first stirring means 11 for rapidly mixing both the reaction solutions 7 and 8 and causing the solutions to react with each other, the stirring means being disposed in a lower interior portion of the mixing chamber 5; and a second stirring means 12 for immediately upward discharging formed silver halide particles to an outside of the mixing chamber, the stirring means being disposed in an upper interior portion of the mixing chamber. An adding system for the silver nitrate solution 7 is provided with constant flow rate holding means 13. Three flow rate controlling means are connected in parallel to an adding system for the halogen salt solution 8 which corresponds to the adding system for the silver nitrate solution. Two of the flow rate controlling means are provided with constant flow rate holding means 14 and 15, respectively. The other flow rate controlling means is provided with flow rate controlling means 17 which is based on an electrode system 16 for detecting a silver ion activity. The apparatus comprises a device (not shown) for switching the constant flow rate holding means 14 to the flow rate controlling means 17 based on the electrode, in accordance with a designated $E_{Ag}$ value.

Figure 3:
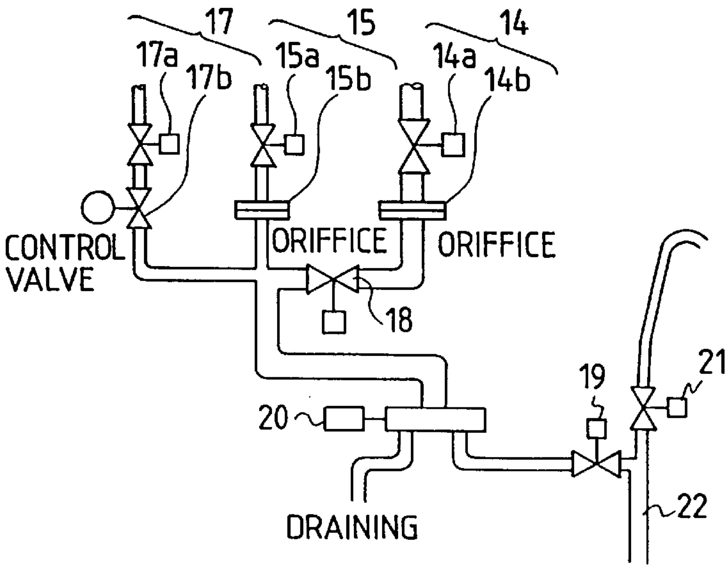
FIG. 3 is a side view of a valve arrangement which is an embodiment of flow rate controlling means for a halogen salt solution which is used in the invention.

Referring to FIG. 3, a manner of embodying the three flow rate controlling means of the adding system for the halogen salt solution will be described. The three valve control systems 14, 15, and 17 are connected in parallel. Two of the systems are provided with the constant flow rate holding means 14 and 15, respectively. The two systems consist of stop valves 14*a* and 15*a* which gate liquids transported by constant-pressure liquid transporting means (for transporting a liquid by means of a constant liquid pressure head or a constant volume pump (not shown)), and constant orifices 14*b* and 15*a* which are volume regulating restrictors, respectively. The other system is provided with the constant flow rate-holding means 17 which is based on an electrode system 16 for detecting a silver ion activity and inserted into a colloid solution in the precipitation vessel. The system consists of a stop valve 17*a* and a flow rate control valve 17*b*. In addition to these components, disposed are a stop valve 18 which opens and closes in relation to the constant flow rate holding means 14, a stop valve 19 and a selector valve 20 which gate the flow rate of the whole of the halogen salt solution system, an adding pipe 22 for adding the halogen salt solution to the precipitation bath, and an air release valve 21 for the pipe.

The function of the precipitation bath shown in FIG. 2 will be described. The silver nitrate solution 7 which is to be added to the precipitation bath through the constant flow rate holding means 13, and the halogen salt solution which is to be added through the constant flow rate holding means 14 and 15 and the stop valve 19 are supplied through the respective supply ports 9 and 10, and then diluted with the colloid aqueous solution charged in the mixing chamber. The reaction solutions are abruptly stirred by the first stirring means 11 disposed in the mixing chamber 5 so that uniform silver halide particles are formed. The silver halide particles are discharged by the second stirring means 12 immediately or within 1 sec. into the colloid aqueous solution existing outside and above the mixing chamber and in the precipitation bath 3, thereby causing the silver halide particles to be aged. The liquid flow passes upward through the interior of the mixing chamber, and the solutions in the precipitation bath are sufficiently stirred. Consequently, the colloid solution in the precipitation bath is easily stirred without producing bubbles due to air entrapment and with a uniform distribution of pAg in the precipitation bath, thereby largely contributing to the uniform aging. Unlike the prior art, therefore, the pAg of the colloid aqueous solution at the start of the addition is not greatly varied, and the $E_{Ag}$ control based on the pAg is not affected by the variation, with the result that $E_{Ag}$ is straightly converged into the target $E_{Ag}$ value.

Figure 4:
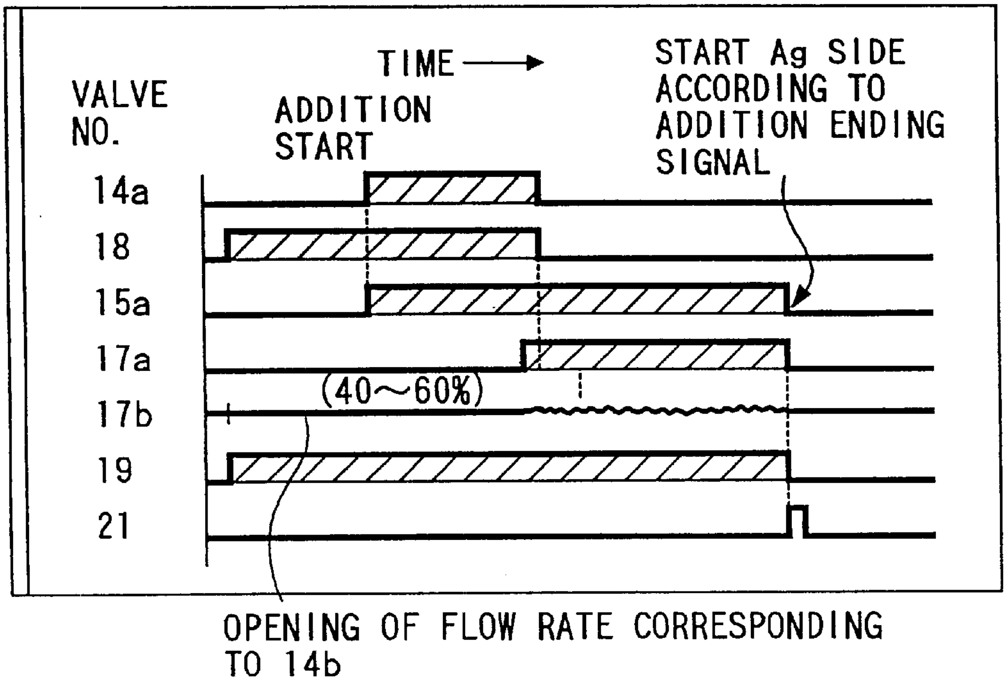
FIG. 4 is a diagram illustrating an embodiment of a sequential operation of the valve arrangement of FIG. 3 used in the invention.

Referring to FIG. 4, the opening and closing sequence status of the flow rate control valve for the halogen salt solution shown in FIG. 3 will be described. Before the start of the reaction, the stop valves 18 and 19 are opened. After the start of the addition, the on-off valves 14*a* and 15*a* are opened, and a constant amount of the silver nitrate solution is added, thereby conducting the constant ratio and flow rate addition of the solutions. When $E_{Ag}$ reaches the designated constant $E_{Ag}$ value as a result of the constant ratio and flow rate addition, the valve 17*a* is opened, and the valve 17*b* held to the opening at which the addition is conducted by the flow rate corresponding to the flow rate of the valve 14*b* is operated so that the $E_{Ag}$ control is started. Simultaneously, the valve 14*a* is closed.

Figure 6:
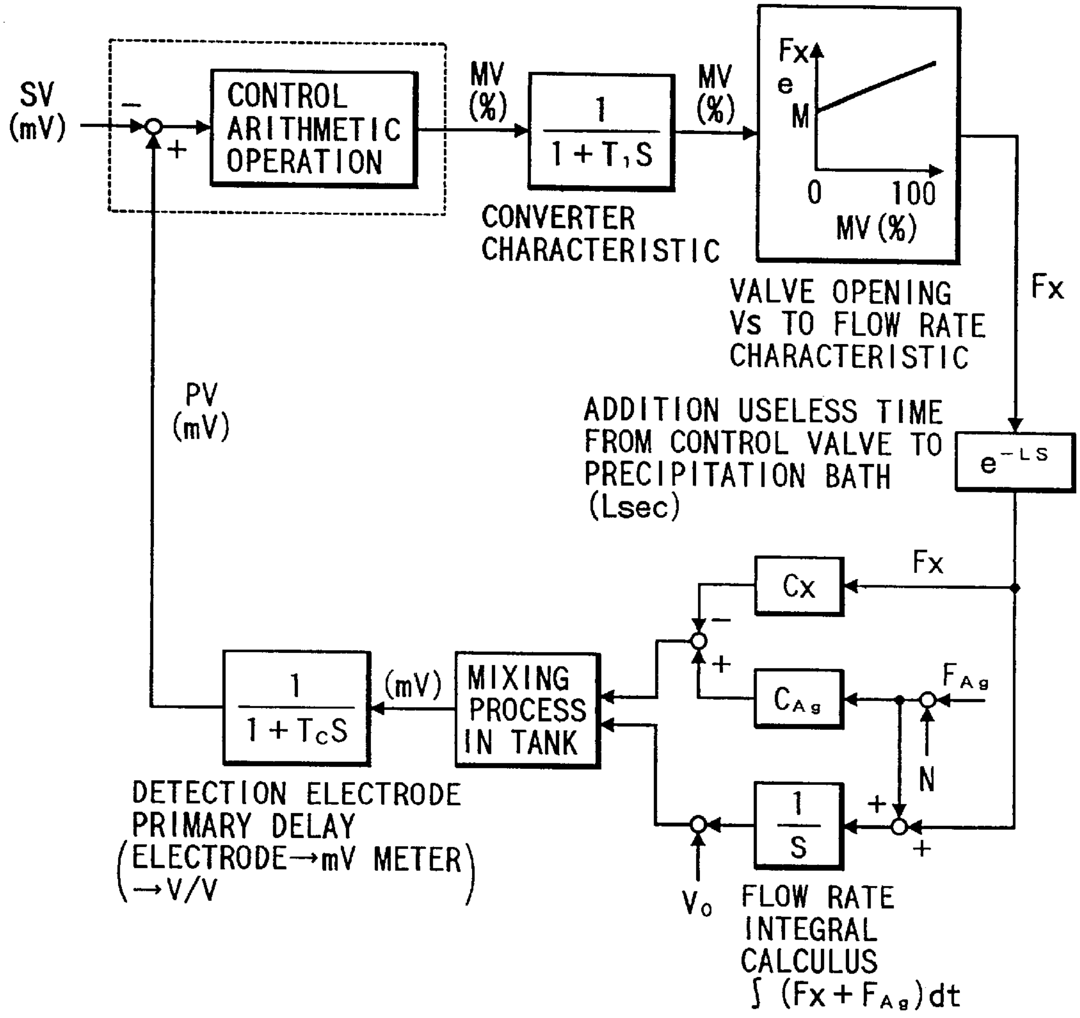
FIG. 6 is a diagram of a plant model of the invention.

In this case, the control is conducted while setting the control parameter constant immediately after the start of the control, in the following manner. The tuning parameter of a controller 23 is held to the minimum response level from 0.1 to 5 sec., preferably from 0.5 to 1.0 sec., and then switched to an optimum tuning parameter which is estimated in accordance with a simulation based on a plant model shown in FIG. 6.

The optimum tuning parameter varies depending on the $E_{Ag}$ value to be controlled, and the solute rates of silver ions and halogen ions which are to be added into the precipitation bath.

Figure 7:
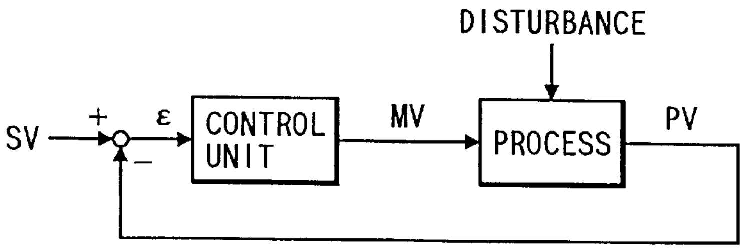
FIG. 7 is a block diagram of a control system of the invention.

The system shown in FIG. 7 is used as the control system, and the control calculations are conducted in accordance with the following equations:

$$E_n=PV_n-SV \quad (9)$$

$$e_n=E_n/SPAN \quad (10)$$

$$\Delta e_n=e_n-e_{n-1} \quad (11)$$

$$\Delta\Delta e_n=\Delta e_n-\Delta e_{n-1} \quad (12)$$

$$\Delta MJ_n=(\Delta MV_n)_{PD}+(\Delta MV_n)_I \quad (13)$$

$$(\Delta MV_n)_{P.D}=K_P\cdot\Delta e_n+K_P\cdot\Delta\Delta e_n \quad (14)$$

$$(\Delta MV_n)_Z=K_I\cdot e_n \quad (15)$$

$$\Delta MV_n=K_P\cdot\Delta e_n+K_I\cdot e_n+K_D\cdot\Delta\Delta e_n \quad (16)$$

$$MV_n'=MV_{n-1}+\Delta MV_n \quad (17)$$

where $PV_n$ indicates the present process value,

SV indicates the preset value, $\Delta MV_n$ indicates the changing amount of the operation output, $MV_n'$ indicates the present operation output, and $MV_{n-1}$ indicates the previous operation output.

The control is conducted at a calculation period of 1 sec. or shorter, preferably 0.2 sec. or shorter.

Figure 5:
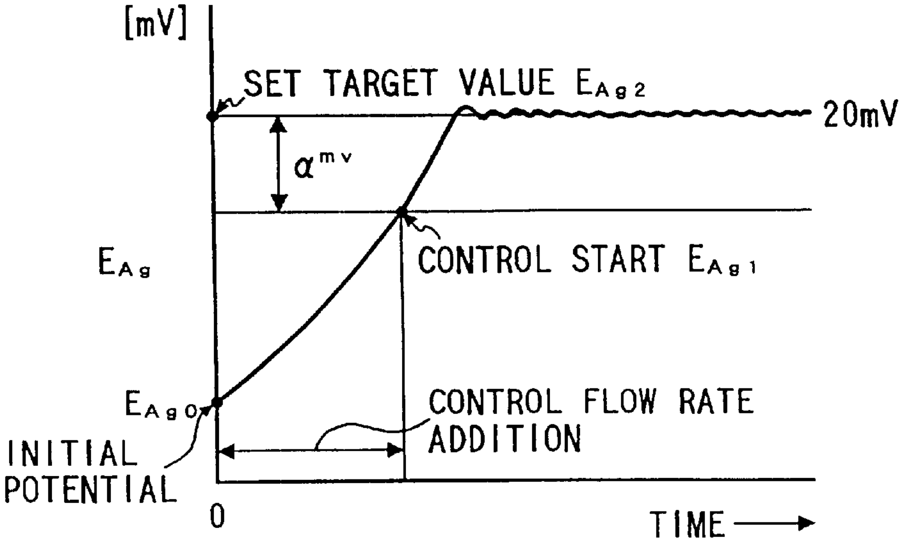
FIG. 5 is a graph illustrating an embodiment of a precipitation progress time versus $E_{Ag}$ used in the invention.

Next, the description will be made with reference to FIG. 5. During the period when $E_{Ag}$ starts from the designated preset control start $E_{Ag1}$ and then reaches the preset target value $E_{Ag2}$, the $E_{Ag}$ value is increased as a result of the flow rate control of the controlling means 17. The control is conducted with reduced variation until $E_{Ag}$ reaches the target value $E_{Ag2}$, and hence $E_{Ag}$ can rapidly reach the target value $E_{Ag2}$ with excellent reproducibility after starting from the initial potential $E_{Ag0}$ in the precipitation bath.

EXAMPLE-1

As described above, according to the method and apparatus of the invention, in the formation of a silver halide emulsion under the above-mentioned conditions, the fluctuation degree of the preset target value $E_{Ag}$ of +20 mV at the steady state is equal to or less than 2 mV. The period when $E_{Ag}$ starts from the designated preset control start $E_{Ag1}$ and then reaches the preset target value $E_{Ag2}$ is equal to or shorter than 1 minute. Furthermore, the potential locus of $E_{Ag}$ exhibited excellent reproducibility.

COMPARISON EXAMPLE-1

Figure 8:
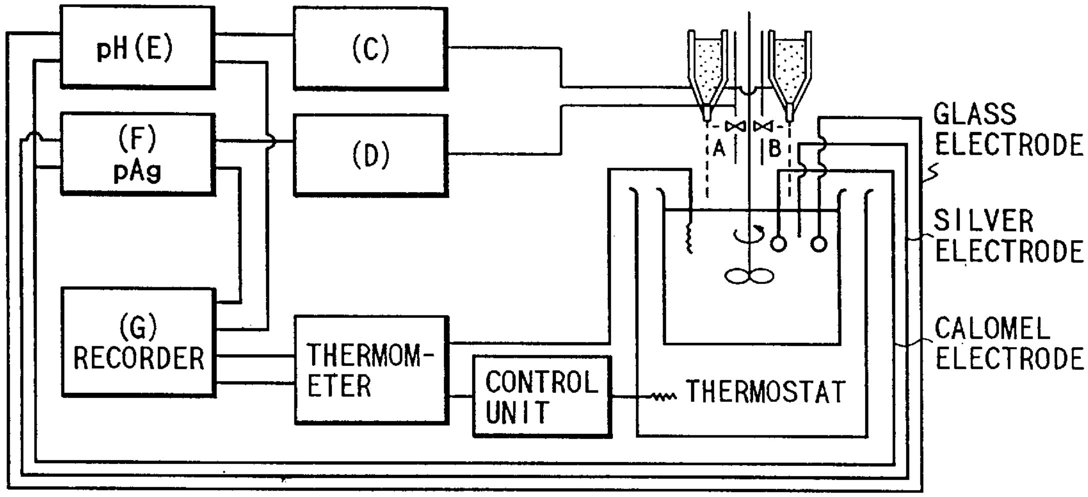
FIG. 8 is a diagram illustrating an apparatus and method of the prior art.

In an apparatus and method (FIG. 8) disclosed in Photogr. Korresp. mentioned above, a silver halide emulsion was formed at a flow rate of 50 ml/min. or higher while controlling the silver ion concentration in precipitation of a silver halide emulsion in a precipitation vessel. When the control was conducted at the preset target value $E_{Ag}$ (+20 mV), the potential fluctuation degree at the steady state was 50 mV. In this case, when $E_{Ag}$ was increased from the initial potential $E_{Ag0}$ of −100 mV at the start of the reaction liquid addition to the preset target $E_{AG2}$ of +20 mV fluctuation of +100 mV sometimes occurred and a period of about 10 min. was occasionally required to be elapsed before a steady state was attained.

Figure 9:
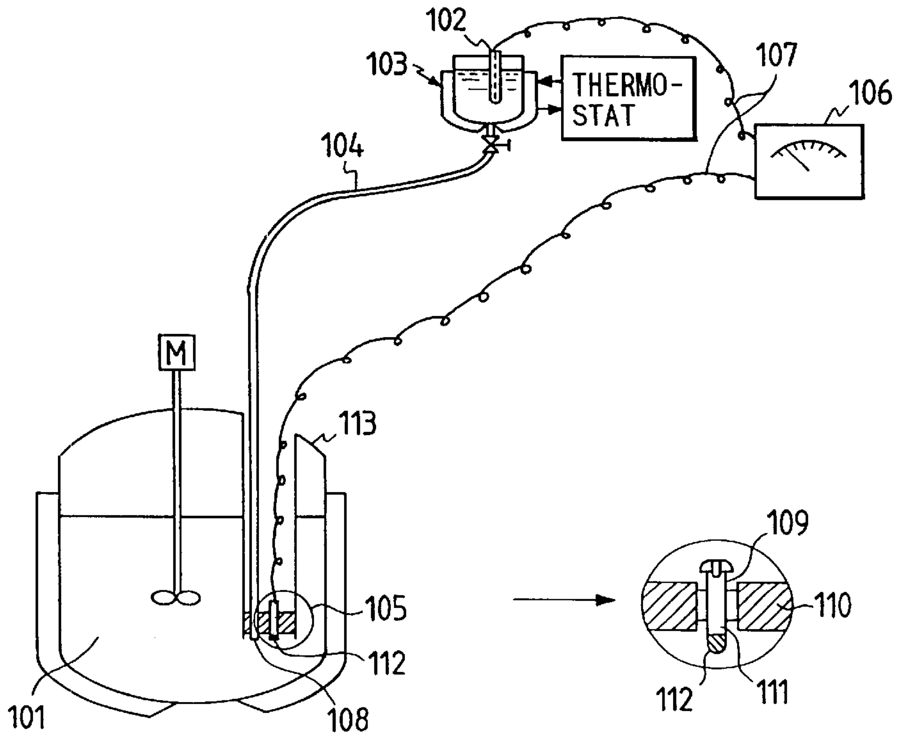
FIG. 9 is a diagram showing the arrangement of the apparatus for a silver or halogen ion concentration according to an embodiment of the invention.

Another embodiment of the invention will be described with reference to FIG. 9.

EXAMPLE-2

In a sensor system which detects as a potential a silver or halogen ion concentration in a gelatin aqueous solution 101 containing silver halide crystals, a method and apparatus for measuring the silver or halogen ion concentration are configured in the following manner. A reference electrode 102 which functions as the reference of the potential measurement is inserted into a heat insulating bath 103 without being directly inserted into the measured liquid 101. The temperature of the heat insulating bath is accurately controlled within ±0.5° C. by a thermostatic chamber so as to have a constant temperature, and is made of polyvinyl chloride or acrylic resin or provided with an insulation property such as a Teflon coating. The measured liquid 101 and the reference electrode 102 are electrically connected with each other by a salt bridge 104. Only one end portion of an indicator electrode 105 is immersed into the measured liquid 101. The reference electrode 102 and the other end portion of the indicator electrode 105 are connected with a potentiometer 106 via an electrically shielded silver wire 107, and the potential difference is measured.

A saturated calomel electrode was used as the reference electrode 102, and ceramic having a porosity of 5 to 15% was used as the ceramic 108 having micropores.

The ceramic 108 having micropores is used in the portion of the salt bridge 104 which makes contact with the gelatin aqueous solution 101 containing silver halide. A potassium nitrate solution of 0.5 to 1.2 Mol/l is used as the inner liquid of the salt bridge 104.

A silver metal rod 109 of a purity of 99.9% or higher was used as the indicator electrode 105. The portion 111 of the indicator electrode 105 which makes contact with a holder unit 10 was plated by Pt or applied with an insulative Teflon coat or a ceramic coat, and supported by the holder unit 110 via two O-rings 114. The surface of the portion 112 which makes contact with the gelatin aqueous solution 101 containing silver halide is plated by AgBr or $Ag_2S$ in a thickness of 0.1 $\mu$m or less.

EXAMPLE-3

Figure 10:
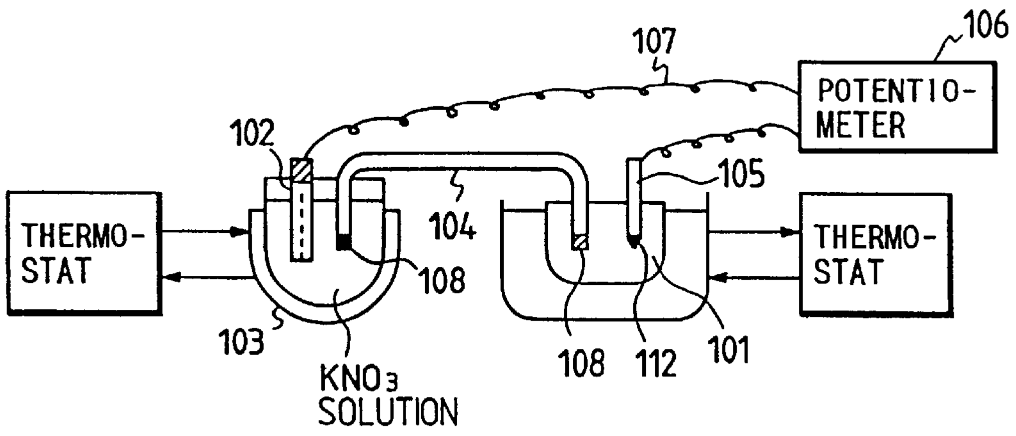
FIG. 10 is a diagram showing the arrangement of the apparatus for a silver or halogen ion concentration according to another embodiment of the invention.

In the embodiment described above, the present method and apparatus for measuring a silver or halogen ion concentration are used in a precipitation vessel 113 for a silver halide emulsion. FIG. 10 shows another embodiment of the measuring apparatus in which a gelatin aqueous solution containing silver halide is sampled.

A reference electrode 102 is immersed into a heat insulating bath 103 for a potassium nitrate solution, and electrically connected with a measured liquid 101 which is a gelatin aqueous solution containing silver halide, via a salt bridge 104 which has at its both ends ceramic 108 having micropores. An indicator electrode 105 has a configuration in which the body portion made of a silver metal rod is electrically insulated and an end portion making contact with the liquid is plated by AgBr or $Ag_2S$. The indicator electrode 105 is immersed into the measured liquid 101. The reference electrode 102 and the other end portion of the indicator electrode 105 are electrically connected with a potentiometer 106 via by a shielded silver wire 107. The measured liquid is maintained to a constant temperature by a thermostatic chamber.

EXAMPLE-4

Figure 11:
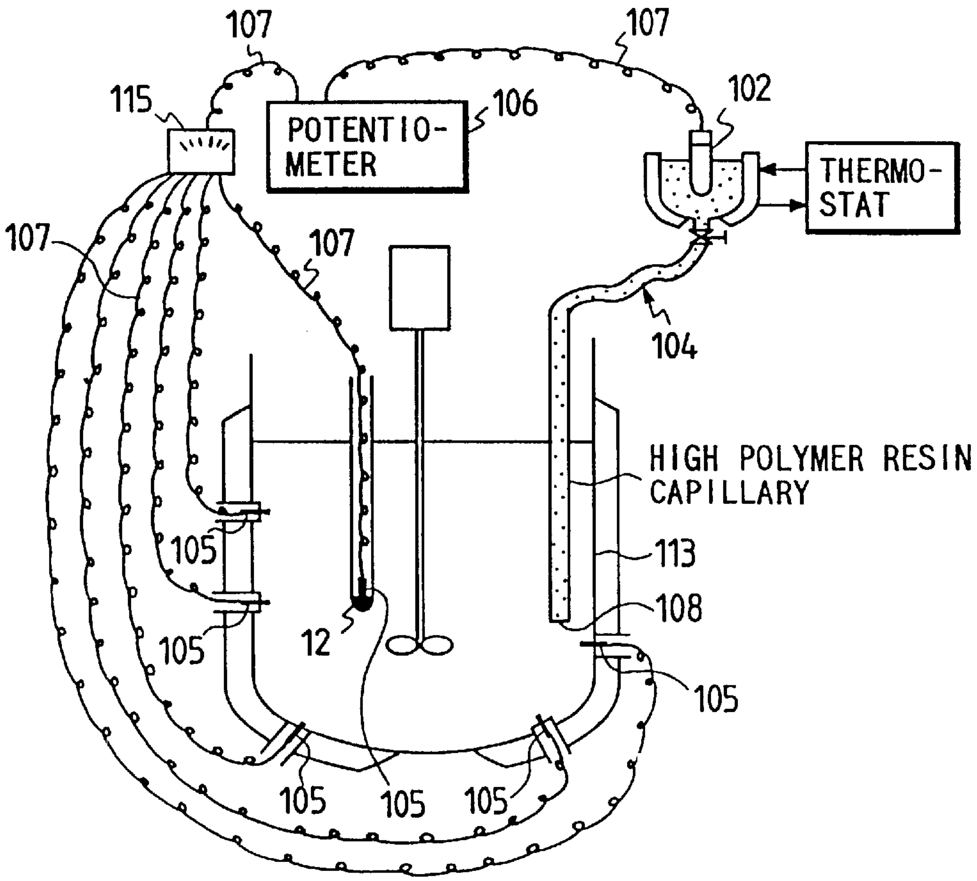
FIG. 11 is a diagram showing the arrangement of the apparatus for a silver or halogen ion concentration according to a further embodiment of the invention.

The arrangement of Example 4 is depicted in FIG. 11. An n number of the indicator electrodes 105 are disposed at arbitrary positions of the precipitation vessel 113 for a silver halide emulsion, and the connections between the indicator electrodes and the potentiometer 106 are switched by a connection switching device 115. In this configuration, it is possible to measure the distribution of the silver or halogen ion concentration in the precipitation vessel.

As was apparent from the above-description, in the formation of a silver halide emulsion while controlling the silver ion concentration in precipitation of a silver halide emulsion in a precipitation bath, the control can reach the preset target $E_{Ag2}$ from the uncontrolled state at the start of precipitation, with excellent reproducibility and in a rapid manner or within a period of 1 min. or shorter which requires 10 min. in the prior art. According to the invention, it is possible to conduct rapidly with excellent reproducibility not only in the control of maintaining the $E_{Ag}$ potential to a constant level, but also in that of changing the $E_{Ag}$ potential in a manner of a ramp function.

Also, according to the present method and apparatus for measuring a silver or halogen ion concentration, the temperature variation of a reference electrode and the generation of an asymmetry potential in the liquid junction of the reference electrode are prevented from occurring, and hence a constant reference potential can be obtained. Furthermore, the portion of an indicator electrode which makes contact with the measured liquid is prevented from being affected by adherence of foreign substances, so that a correct measurement is enabled. Therefore, the invention can attain effects such as the followings:

(1) The electrode potential in relation to the silver or halogen ion activity in various silver halide emulsions can be measured immediately or within 1 sec. or shorter (in the prior art, when the indicator electrode is immersed into another measured liquid, a period of about 5 to 50 min. must be elapsed until a constant potential is obtained).

(2) In the prior art, the silver potential of a precipitation vessel during the formation of silver halide crystals is often deviated by a degree of about 50 mV or more. In contrast, according to the invention, the potential can be detected with accuracy of =1 mV and excellent reproducibility, with the result that a silver halide photographic emulsion can be produced with excellent reproducibility.

(3) In addition, the life of the reference electrode can be prolonged. When the interior of a tank is subjected to an automatic high temperature cleaning process, also the sensor unit can be cleaned simultaneously. Consequently, the preparation of the next product of another kind can be conducted in a perfectly automatic manner.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for measuring a silver or halogen ion concentration, comprising:

a heat insulated bath containing a salt solution;

a reference electrode which is disposed in the heat insulated bath;

a salt bridge having one end connected to an end portion of said reference electrodes;

a receptacle containing gelatin aqueous solution containing silver halide crystals, a second end of said salt bridge contacting said gelatin aqueous solution;

an indicator electrode, only one end portion of said indicator electrode being immersed into the gelatin aqueous solution containing silver halide crystals; and a potentiometer which is electrically connected with said reference electrode and another end portion of said indicator electrode via a silver wire.

2. An apparatus for measuring a silver or halogen ion concentration according to claim 1, wherein ceramic having micropores is used in a portion of said salt bridge, said portion making contact with the gelatin aqueous solution containing silver halide crystals, and a potassium nitrate solution is used as an inner liquid of said salt bridge.

3. An apparatus for measuring a silver or halogen ion concentration according to claim 1, wherein said indicator electrode comprises a silver metal rod of a purity of 99.9% or higher having one of platinum plating and an insulating material coating on a portion defining a support of said indicator electrode, and having a AgBr or $Ag_2S$ plating in a thickness of 0.1 $\mu$m or less on the portion making contact with the gelatin aqueous solution.

4. The apparatus of claim 1, wherein said heat insulated bath is electrically insulated.

* * * * *